United States Patent [19]

Montie

[11] 4,441,364

[45] Apr. 10, 1984

[54] LIQUID-LEVEL TRANSDUCER/INDICATOR

[75] Inventor: Douglas L. Montie, Norwich, Conn.

[73] Assignee: Thomas G. Faria Corp., Uncasville, Conn.

[21] Appl. No.: 266,598

[22] Filed: May 22, 1981

[51] Int. Cl.³ .............................................. G01F 23/10
[52] U.S. Cl. ............................................ 73/313; 73/317
[58] Field of Search .................................. 73/313, 317

[56] References Cited

U.S. PATENT DOCUMENTS

| | | | |
|---|---|---|---|
| Re. 25,208 | 7/1962 | Perkins | 73/313 |
| 350,279 | 10/1886 | Wickersham | 73/313 |
| 943,868 | 12/1909 | Garlick | 73/317 |
| 1,366,832 | 1/1921 | Pierce | 73/313 X |
| 1,522,355 | 1/1925 | Winterhoff | 73/313 X |
| 1,591,462 | 7/1926 | Winterhoff | 73/313 X |
| 2,198,055 | 4/1940 | Liner | 73/313 |
| 2,264,487 | 12/1941 | Smulski | 73/313 |
| 2,325,582 | 8/1943 | Andersen | 73/317 X |
| 2,624,821 | 1/1953 | McCandless | 73/313 X |
| 2,752,783 | 7/1956 | Fauvelot | 73/313 |
| 3,168,904 | 2/1965 | Conover | 73/317 X |
| 3,432,790 | 3/1969 | Svilpe et al. | 73/313 X |
| 4,184,370 | 1/1980 | Schlick et al. | 73/313 |

FOREIGN PATENT DOCUMENTS 447499 5/1930 United Kingdom .................. 73/313

Primary Examiner—Gerald Goldberg
Assistant Examiner—Joseph W. Roskos
Attorney, Agent, or Firm—Hopgood, Calimafde, Kalil, Blaustein & Judlowe

[57] ABSTRACT

The invention contemplates a liquid-level sensing transducer having a baseplate which is adapted to removably secure the same to close an opening in a tank within which liquid level is to be measured by noting the angle of a pivoted float arm. A pivot-bearing mount of insulating material is secured by two spaced bolts to the baseplate, and this mount establishes two spaced parallel planes of support which are perpendicular to the pivot axis. A conductive plate is mounted in one of these two planes, and an electrical-resistance element is mounted in the other of these planes. A float-arm pivot member is rotatable in the pivot-bearing mount and includes a radially offsetting arm which sweeps the space between the parallel planes. The offsetting arm of the pivot member supports a moving-contact element in resiliently loaded wiping contact with the conductive plate at one end and with the resistance element at the other end. The mounting bolts provide two-pole electrical access (a) to the conductive plate and (b) to an end of the electrical resistance. And a base-plate window between the bolt connections provides direct viewing of an arcuate indicator surface which is an integral part of the pivot member.

18 Claims, 8 Drawing Figures

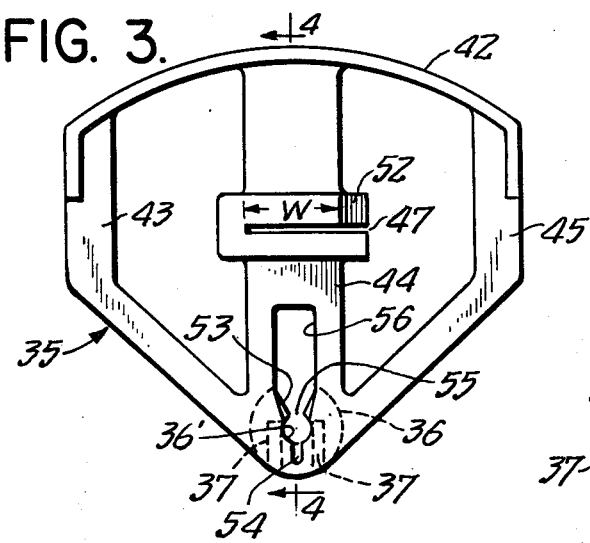
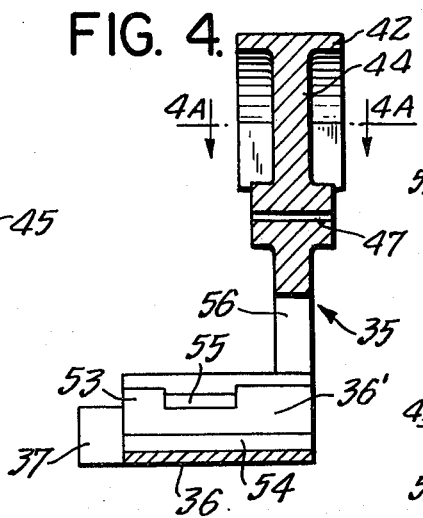
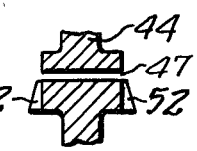
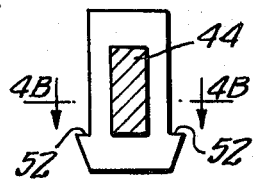
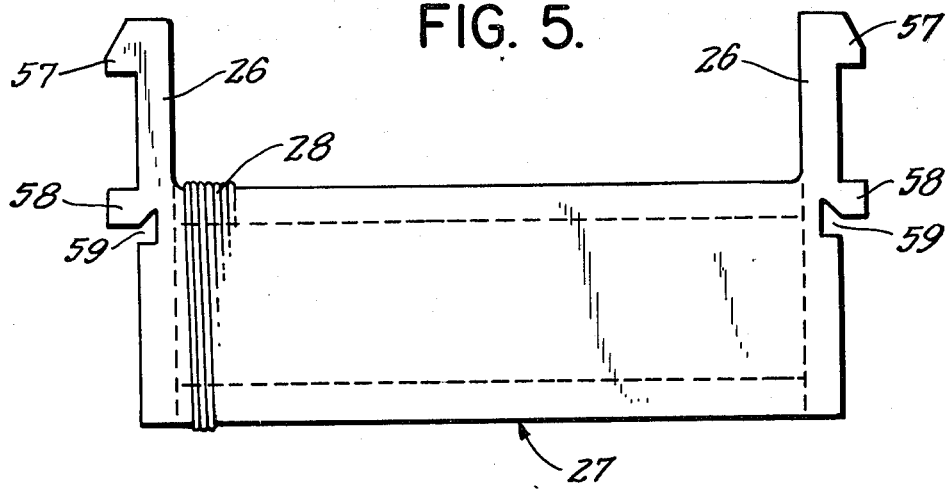
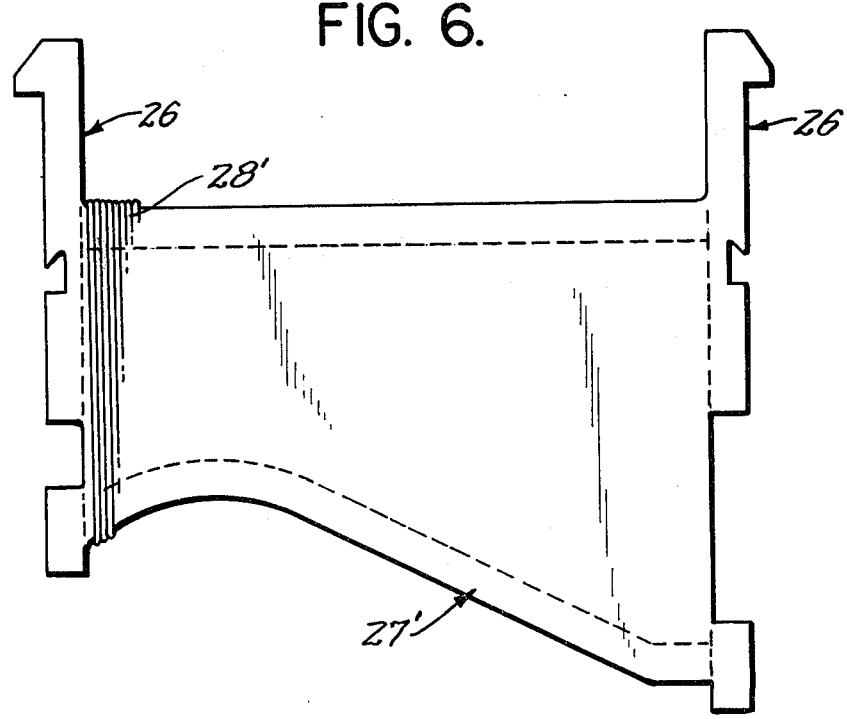

LIQUID-LEVEL TRANSDUCER/INDICATOR

BACKGROUND OF THE INVENTION

The invention relates to liquid-level measuring instrumentation, particularly suited to application to a fuel tank, as for use with a vehicular or stationary internal-combustion engine.

Known liquid-level transmitters are electrical transducers employing float-operated variable resistance, for use in vented tanks. They provide a means of remote liquid-level indication by sensing the level and by effectively transmitting an electrical resistance, proportional to that level, to a receiver guage, located at some other point, remote from the tank.

Known liquid-level indicators are unitary float-operated mechanical devices also for use in vented tanks. Such indicators are used for sensing level and directly indicating that level, by means of a mechanical linkage, as to a pointer which rotates about an indicator dial. The indicator dial and pointer are unit-handling parts of such devices and are readable directly at the tank.

BRIEF STATEMENT OF THE INVENTION

It is an object of the invention to provide an improved instrument of the character indicated.

It is a specific object to provide such an instrument which is both a liquid-level transmitter and a liquid-level indicator and which, therefore, provides for both direct-reading at the tank and electrical transmission for remote reading.

Another specific object is to provide a unitary structure to achieve the above objects and with flange-mounting adaptability to the top of a tank.

A further specific object is to achieve simplicity, reliability, inherent accuracy, ready calibration, and low cost in such a device, both from initial-cost and maintenance-cost viewpoints.

A still further object is to meet the above objects with a basic modular structural relationship which enables low-cost component-module substitution to achieve the particular mechanical and/or electrical modification necessary to serve particular float-operated characteristics of tanks of different volume and contour.

The invention achieves these objects and further features in a simple base-plate mounted assembly, wherein the baseplate is removably securable to close an opening in the top of a tank within which liquid level is to be measured. A pivot-bearing mount of insulating material is secured to the baseplate, by two spaced bolts which also serve as electrical terminals, the pivot-bearing axis being horizontal and offset beneath the baseplate. The pivot-bearing mount establishes two spaced parallel planes of support which are perpendicular to the pivot axis; a conductive plate is mounted in one of these two planes, and an electrical-resistance element is mounted in the other. A float-arm pivot member is journaled in the pivot-bearing mount and includes a radially offsetting arm which sweeps the space between the parallel planes and within the offset beneath the baseplate. For electrical-transmission purposes, a single moving-contact element is carried by the offsetting arm, in resiliently loaded wiping contact with the conductive plate at one end and with the resistance element at the other end, while the mounting bolts provide separate means of electrical access (a) to the conductive plate and (b) to an end of the electrical resistance. For direct-indicator purposes, a base-plate window between the bolt connections exposes to view an arcuate indicator surface which is an integral part of the pivot member.

DETAILED DESCRIPTION

The invention will be illustratively described in detail in conjunction with the accompanying drawings, in which:

FIG. 3 is an axial-end view in elevation of the float-arm pivot component of the assembly of FIG. 1;

FIG. 4 is a sectional view taken at 4—4 in FIG. 3;

FIG. 4A is a sectional view taken at 4A—4A in FIG. 4;

FIG. 4B is a fragmentary sectional view taken at 4B—4B in FIG. 4A; and

FIGS. 5 and 6 are similar views in elevation, for alternative electrical-resistance components, to illustrate one aspect of selective modification of the assembly of FIG. 1.

Figure 1:
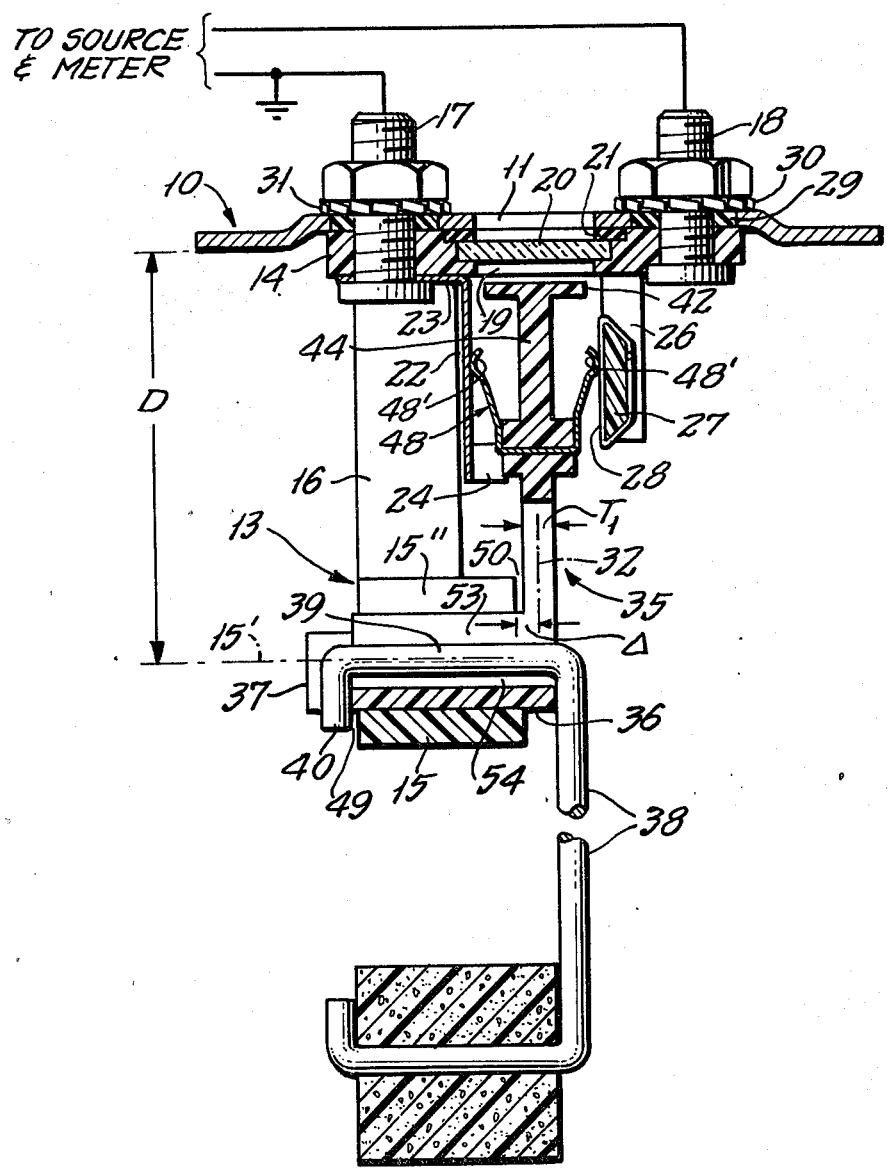
FIG. 1 is a vertical sectional view through a transmitter/indicator assembly of the invention.
Figure 2:
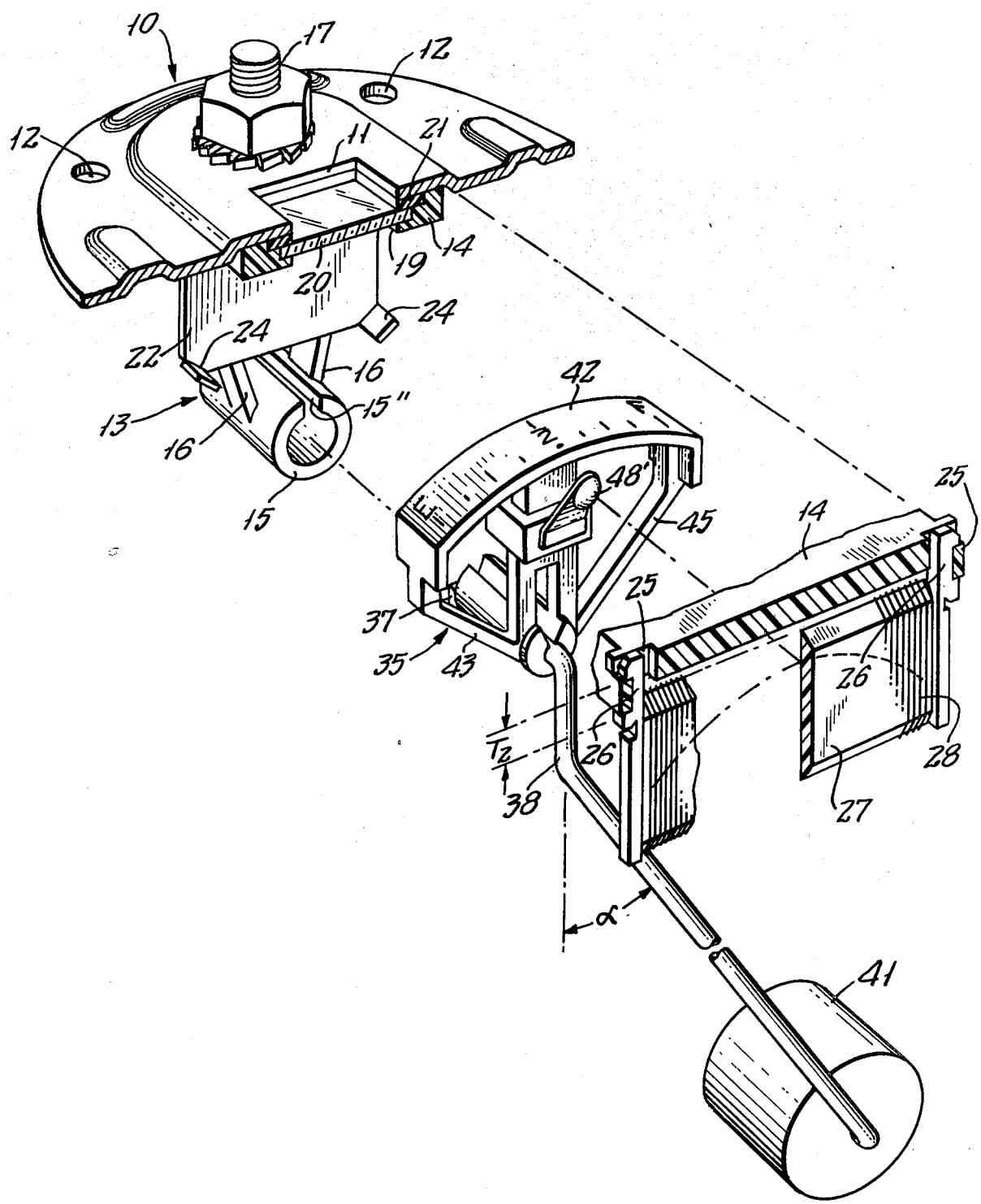
FIG. 2 is a partly broken-away exploded view in perspective to show interrelationship of modular components of the assembly of FIG. 1.

Referring initially to FIGS. 1 and 2, the unit-handling assembly of the invention is built upon a circular baseplate 10, having a central rectangular opening 11 through which depth readings are directly viewable, and having peripherally distributed openings 12 via which the assembly may be removably secured to a top opening in a tank (not shown) within which liquid level is to be observed. A pivot-bearing mount 13 is of insulating material, preferably a single injection-molded piece, of suitable plastic such as nylon. The mount 13 includes a frame portion 14 which seats against the baseplate 10, and a pivot-bearing portion 15 having integral rugged connection to the frame portion 14 via spaced struts 16; the bearing portion 15 establishes a horizontal pivot axis 15', at an offset D beneath the baseplate 10. Spaced bolts 17–18, on opposite sides of the opening 11, secure mount 13 via its frame portion 14 to the underside of baseplate 10. In this secured relation, a rectangular opening 19 in frame portion 14 registers with the base-plate opening 11, and a window glass 20 and sealing gasket 21 are retained by and between coacting formations of parts 10–13 at the edges of openings 11–19.

In the described relation of parts 10–13, two axially spaced parallel support planes are established, perpendicular to the pivot axis 15' and adjacent opposed edges of the window openings 11–19. In a first of these planes, a conductive metal plate 22 is fixedly mounted, backed by the struts 16 and secured by a flange 23 at its upper end, flange 23 being clamped between the head of bolt 17 and the adjacent flat surface of frame portion 14, between struts 16; plate 22 is shown with integral bent ear or lug formations 24, to serve a limit-stop function which will later become clear. To establish the second of these spaced planes, the frame portion 14 includes like spaced socket formations 25 into which spaced upstanding arms 26 of a second plate structure 27 are insertably assembled by snap-lock action, preferably but not necessarily before the parts 10–13 are assembled to each other. Preferably, the plate structure 27 is a single injection-molded piece of insulating plastic material, which may again be nylon. As shown, the structure 27 comprises a rectangular panel for which arms 26 are integral end formations, and a winding 28 of electrical resistance wire is developed around and progressively along the panel, from one to the other of the arms 26; one end of this wire winding will be understood to be connected beneath the head of bolt 18, and an insulating bushing 29 and an insulating washer 30 assure external terminal contact to winding 28 via bolt 18. Similar insulated treatment of bolt 17 may be provided, but as shown, a conductive sharp-toothed washer 31 beneath the clamp nut for bolt 17 assures that plate 22 will be grounded to baseplate 10, via bolt 17.

For the relationship thus far described, the plate 22 and the wire-wound panel of plate structure 27 will be seen to have parallel confronting surfaces that are equally spaced on opposite sides of the plane 32 which is perpendicular to the pivot axis 15', through the center of window openings 11–19. It will also be seen that the bearing portion 15 includes a cantilevered projection, beyond struts 16, into close proximity with this central plane 32.

A float-arm pivot member 35 is preferably also a single integrally formed injection-molded plastic part, which again may be of nylon. Member 35 has a cylindrical bearing portion 36 having low-friction rotational support in the bore of the bearing portion 15 of support 13. Integrally formed at one end of the bearing portion 36 is a pair of lugs 37 which are spaced by the thickness of a bent rod or wire 38; at the upper end of rod 38, an axially bent length 39 is nested in the elongate bore 36' of bearing portion 36, and a short downwardly bent tip 40 locates between lugs 37, thereby locking rod 38 to pivot member 35. The lower end of rod 38 carries a float 41, at bent lateral offsets α from the vertical plane of symmetry depicted in FIG. 1.

The pivot member 35 is further characterized by a cylindrically arcuate rim or panel 42, integrally related to bearing portion 36 by three angularly spaced leg formations 43-44-45; indicia ranging from "E" (empty) to "F" (full), with interposed divisional markings, are inscribed on the outer surface of panel 42 and are visible through window 20, as direct indications of float-actuated angular orientation of member 35. The center leg 44 is provided with a lateral-access slot 47 to receive, with snap-lock retention, the inserted center-body portion of a conductive contact-wiper element 48. Element 48 is bent from compliant sheet stock and has two like oppositely facing wings 48' which develop light outwardly loaded resilient contact with plate 22 and the exposed face of winding 28, respectively. The symmetry of wing (48') formation assures that the central plane of the pivot-member arms 43-44-45 coincides with the central plane 32, midway between the wiper-contacted surfaces at 22–28. And since the bearing portion 36 is slightly more elongate than its support-bearing portion 15, there can be a first axial clearance 49 between wire end 40 and bearing portion 15, and a second axial clearance 50 between the other end of bearing portion 15 and the arms 43-44-45; stated in other words, the offset Δ between plane 32 and the nearby end of bearing portion 15 is slightly greater than half the thickness T of the arms 43-44-45.

To provide assurance that the angular swing of pivot member 35 will not carry wing contacts 48' beyond lateral limits of the angular range of instrument operability, the Plate 22 is provided with integral lugs 24, bent from the lower corners of plate 22 and extending, as stops, into the path of movement of pivot member 35.

Having identified major parts and their relationships, further detail will now be provided to explain features which enable component-module assembly by snap-lock insertion procedures.

First, the preformed double-wing wiper element 28 has a center-body width which is just short of the effective width W of slot 47, between latch projections 52 (on each side of arm 44) and the closed end of slot 47. Thus, on slot insertion of the center body of wiper element 48, each of the wings snaps into retained position behind its latch 52, on reaching its fully inserted position.

Second, for snap-retained assembly of rod 38 to bearing portion 36, the bore 36' is less than continuously cylindrical, being upwardly open along a divergent mouth 53, for the full longitudinal extent of portion 36 (see FIGS. 3 and 4). A vertically short downward slot or groove 54, also opening to bore 36' and for the longitudinal extent of portion 36, so locally weakens the connection between symmetrical halves of portion 36, that the rod section 39 can be pressed downward past a limited throat 55 to snap into fully retained position in bore 36'. In order that connection of leg 44 to portion 36 shall not interfere with the transient stiffly compliant deformation associated with snap assembly of rod section 39 to bore 36', an extended opening 56 is provided in leg 44, contiguous to the mouth opening 53. It will be noted that the support-bearing portion 15 is, like the rotary bearing portion 36, also upwardly open along a longitudinal slot 15" of width to accommodate the diameter of rod section 39; thus, the float-arm rod 38 may be selectively assembled to bearing Portion 36, whether or not bearing portions 15–36 have been assembled to each other.

Third, for snap-retained assembly of the resistance panel 27 to the frame portion 14, the two outboard arms 26 thereof are provided with hook formations 57 and with stop lugs 58 which provide well-defined shoulders for accurate locating engagement over upper and lower limits of the engaged thickness $T_2$ (see FIG. 2) of base portion 14. Local slot formations 59 near the juncture of arms 26 to panel 27 so locally weaken the structure as to facilitate the stiffly compliant transient deformation necessary to accommodate the insertion displacement that is involved prior to snap-action retention via locating engagements by formations 57–58.

The winding 28 on panel 27 (FIG. 5) will be understood to be illustrative of a substantially linearly developable resistance characteristic, i.e., resistance is a substantially linear function of the wiper 48 contact position throughout its sweep of contact relations. Alternatively, a specially characterized resistance can be provided by resort to bottom-edge contouring of a similar panel 27', as shown in FIG. 6, it being understood that the winding 28' over panel 27' is developed otherwise as described for winding 28. Whatever the non-linear characterizing, it will be clear that integral arm formations 26' may be as described at 57-58-59 for panel 27, for the same ease of modular assembly to and retention by base portion 14.

It will be understood that the described device meets all stated objects, providing both (a) direct readability of liquid level via window 20 (which may have a central transverse hairline, not shown, for precise readability against inscriptions at (42) and (b) remote electrical transmission of the equivalent information, electrically expressed as a resistance between terminals 17–18. In FIG. 1, legends indicate the grounding and remote meter connections to which terminals 17–18 are directly establishable.

The described snap-in assembly features of the invention will be seen to constitute a major advance over previous constructions. No special assembly tools, machines or component parts are needed with the present invention; by contrast, prior constructions of float-operated indicators or transmitters required rivet, eyelet, and/or welding operations which are completely avoidable with the structure of the invention. The snap-in assembly of the wire windings will be seen to offer a design flexibility applicable to tank sizes and tank contours of every nature; moreover, even if a winding should wear out, its replacement is a simple snap-in operation, without requiring that the rest of the device be scrapped.

Aside from the foregoing, the new construction offers operational reliability unachievable with prior devices. With the new construction, the float rod 38, the contact (and stop) plate 22, the resistance coil 28 and the indicator/coil support 13–35 are combined into a single subassembly, which not only eliminates individual parts which previously had to be connected by pivots and linkages, but also assures that (a) end-thrust friction can be totally avoided in that the two wiper actions are differentially developed over the two wiped surfaces and (b) the paths of wiper contact will be kept continuously clean and characterized by reliably low-resistance contact.

Additionally, the inclusion of adjustable stops 24 at the ends of plate 22 will be seen to make calibration a fast and simple operation. The float rod 38 is first moved to the "empty" position, and the empty-position stop 24 is bent until the correct resistance for that position is read on a standard ohm meter, when connected to the terminal bolts 17–18 of the unit. The float rod 38 is then displaced to the "full" position, and the full-position stop 24 is bent until the correct resistance is observed (on the ohm meter) to have been obtained for that position.

While the invention has been described in detail for the preferred embodiment, it will be understood that modifications may be made without departing from the scope of the invention.

What is claimed is:

1. As an article of manufacture, a liquid-level sensing component comprising a baseplate having means for removably securing the same to close an opening in a tank within which liquid level is to be monitored, a bearing mount of insulating material having a base portion adapted to fit to the underside of said baseplate, two spaced terminal bolts extending through spaced openings in said plate and clamping said bearing mount thereto, at least one of said bolts being insulated from said plate, said bearing mount integrally including a journal-bearing formation establishing a pivot axis offset from and generally parallel to said plate, a conductive plate supported by said mount and having electrical connection to a first of said bolts, said conductive plate having an elongate substantially flat wiper-contact area in a first plane that is radial with respect to said axis, a second plate of insulating material carried by said mount and having an elongate substantially flat surface in a second plane that is radial with respect to said axis and in spaced confronting relation to said conductive plate, a float arm pivotally supported with a measure of axial-displacement accommodation at said journal-bearing formation and carrying a single compliant conductive wiper member within the space between said plates, said wiper member having separate wiper arms extending in oppositely diverging directions and in resiliently loaded wiping contact with both said plates, said insulating plate including a resistance element exposed to wiper contact, and an electrical connection from one end of said resistance element to the second of said bolts.

2. The article of claim 1, wherein said bearing mount is a single piece of injection-molded plastic.

3. The article of claim 1, wherein said baseplate is of metal and the other of said bolts has electrical-grounding connection to said baseplate.

4. The article of claim 3, in which said first bolt is said other bolt and said second bolt is said one bolt, whereby said conductive plate is grounded to said baseplate and said one end of said resistance element is electrically isolated from ground.

5. The article of claim 1, wherein said resistance element comprises a winding of electrical-resistance wire around said second plate and progressively developed in the elongate direction of said second plate.

6. The article of claim 5, in which the wound portion of said second plate is substantially uniform width in the direction of winding progression.

7. The article of claim 5, in which the wound portion of said second plate is of characterized non-uniform width in the direction of winding progression.

8. The article of claim 1, in which said conductive plate integrally includes a lug interposed between said mount and baseplate and local to and clamped by said first bolt.

9. The article of claim 1, in which said float arm includes a unitary injection-molded plastic component providing the sole support of said wiper member.

10. The article of claim 9, in which said component includes an indicium-bearing surface that is arcuate about the pivot axis, said baseplate having window means located to expose said indicium-bearing surface to view from the upper side of said baseplate.

11. The article of claim 1, in which said second plate and said bearing mount have coacting formations with snap-lock engagement upon assembly to each other.

12. The article of claim 1, in which said wiper member is bent from compliant sheet metal and comprises a central body protion by which it is connected to said float arm, said wiper member having like wiper wing formations at each end of said body portion, said wing formations being mirror images of each other and retained in compliant compressional stress by their respective contacts with said plates.

13. The article of claim 12, in which said float arm has a lateral slot for assembled reception of the body portion of said wiper member, and snap-acting means coacting between said float arm and wiper member upon achievement of inserted assembly, for retaining the assembled relationship.

14. The article of claim 1, in which one of said plates includes a stop formation projecting into the pivoted path of movement of said float arm for determining one limit of float-arm movement.

15. The article of claim 14, in which said stop formation is one of two, the second of which determines the other limit of float-arm displacement.

16. The article of claim 1, in which said float arm comprises an injection molded plastic part and a metal rod arm-extension part, said plastic part integrally including a bearing portion having pivot coaction with said journal-bearing formation and a wiper-supporting arm portion, said rod having a float-supporting first end and a second end bent for attachment to said plastic part, the bearing portion of said plastic part having a cylindrical bore on the pivot axis and an elongate external-access slot to an angularly limited cylindrically arcuate portion of the bore, and the bent end of said rod being capable of removable snap-action assembly to said bore view said access slot.

17. The article of claim 16, in which locating-lug formations on said plastic part have angular-locating engagement with said rod upon completion of the snap-action assembly.

18. As an article of manufacture, a liquid-level sensing element comprising a base plate having means for removably securing the same to close an opening in a tank within which liquid level is to be monitored, a float arm and means suspending one end thereof for pivot action about an axis at fixed offset from one side of said base plate and with a measure of axial-displacement accommodation, an arcuate scale carried by said float arm within said offset, said plate having a viewing window through which said scale is externally viewable; variable resistance means including a resilient wiper carried by said float arm and a resistance element fixed with respect to said baseplate for developing variable electrical resistance as a function of float-arm position, said variable resistance means further including a conductive element fixed with respect to said baseplate and so spaced from said resistance element as to interpose said wiper between said conductive element and said resistance element, said wiper comprising two divergent arms in resiliently compressed continuous contact with said resistance element and with said conductive element, respectively; and electrical-connection means accessible at the other side of said baseplate and having electrical connection to said resistance element and to said conductive element, respectively.

* * * * *